United States Patent
Hiramatsu et al.

(10) Patent No.: US 8,670,257 B2
(45) Date of Patent: Mar. 11, 2014

(54) POWER CONVERSION APPARATUS

(75) Inventors: Kazuhiko Hiramatsu, Fukuoka (JP); Tadashi Sadohara, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 0 days.

(21) Appl. No.: 13/600,710

(22) Filed: Aug. 31, 2012

(65) Prior Publication Data

US 2013/0058144 A1    Mar. 7, 2013

(30) Foreign Application Priority Data

Sep. 1, 2011    (JP)    ................................ 2011-191052

(51) Int. Cl.
*H02M 7/44*      (2006.01)

(52) U.S. Cl.
USPC ............................................................. 363/97

(58) Field of Classification Search
USPC ................ 363/34, 35, 37, 50, 78, 95, 97, 131
See application file for complete search history.

(56) References Cited

U.S. PATENT DOCUMENTS

| | | | | |
|---|---|---|---|---|
| 4,328,454 | A * | 5/1982 | Okuyama et al. | 318/803 |
| 5,373,223 | A * | 12/1994 | Akagi et al. | 318/722 |
| 5,686,766 | A * | 11/1997 | Tamechika | 307/43 |
| 5,751,567 | A * | 5/1998 | Toyozaki et al. | 363/89 |
| 5,774,347 | A * | 6/1998 | Nakanishi | 363/81 |
| 5,926,381 | A * | 7/1999 | Moriguchi et al. | 363/17 |
| 7,751,211 | B2 * | 7/2010 | Yuzurihara et al. | 363/127 |
| 8,102,686 | B2 * | 1/2012 | Katou et al. | 363/61 |
| 8,243,482 | B2 * | 8/2012 | Ueda et al. | 363/163 |
| 8,305,780 | B2 * | 11/2012 | Saruwatari et al. | 363/37 |
| 8,350,518 | B2 * | 1/2013 | Ueda et al. | 318/810 |
| 2007/0273342 | A1 | 11/2007 | Kataoka et al. | |

FOREIGN PATENT DOCUMENTS

| | | |
|---|---|---|
| JP | 3023647 B2 | 6/1996 |
| JP | 10-084675 | 3/1998 |
| JP | 10-229682 | 8/1998 |
| JP | 2002-335632 | 11/2002 |
| JP | 2008-043184 | 2/2008 |

OTHER PUBLICATIONS

Japanese Office Action for corresponding JP Application No. 2011-191052, Jul. 16, 2013.

* cited by examiner

*Primary Examiner* — Adolf Berhane
(74) *Attorney, Agent, or Firm* — Ditthavong Mori & Steiner, P.C.

(57) ABSTRACT

A power conversion apparatus includes a power converter, a voltage detector, a current detector, a detection voltage adjustor, and a controller. The power converter is configured to convert power from a power source into alternating-current power and is configured to output the alternating-current power to a power system. The voltage detector is configured to detect a voltage of the power system. The current detector is configured to detect a direct-current component of a current between the power converter and the power system. The detection voltage adjustor is configured to add a bias corresponding to the direct-current component to the voltage detected by the voltage detector, so as to generate a voltage detection signal, and is configured to output the voltage detection signal. The controller is configured to control the power converter to output an alternating-current voltage corresponding to the voltage detection signal.

19 Claims, 7 Drawing Sheets

POWER CONVERSION APPARATUS

CROSS-REFERENCE TO RELATED APPLICATIONS

The present application claims priority under 35 U.S.C. §119 to Japanese Patent Application No. 2011-191052, filed Sep. 1, 2011. The contents of this application are incorporated herein by reference in their entirety.

BACKGROUND OF THE INVENTION

1. Field of the Invention

The present invention relates to a power conversion apparatus.

2. Discussion of the Background

Power conversion apparatuses include a power converter to convert power from a power source into alternating-current (AC) power and to output the AC power to a power system. Examples of the power conversion apparatuses include system-interconnection inverters. The inverters convert direct-current (DC) power from solar cells, fuel cells, and other power sources into AC power and output the AC power to a power system.

Japanese Patent No. 3023647 discloses such a power conversion apparatus. The power conversion apparatus detects DC components contained in output current of the power converter and reflects the result of detection on a current feedback system, in an attempt to remove the DC components of the output current.

SUMMARY OF THE INVENTION

According to one aspect of the present invention, a power conversion apparatus includes a power converter, a voltage detector, a current detector, a detection voltage adjustor, and a controller. The power converter is configured to convert power from a power source into alternating-current power and is configured to output the alternating-current power to a power system. The voltage detector is configured to detect a voltage of the power system. The current detector is configured to detect a direct-current component of a current between the power converter and the power system. The detection voltage adjustor is configured to add a bias corresponding to the direct-current component to the voltage detected by the voltage detector, so as to generate a voltage detection signal, and is configured to output the voltage detection signal. The controller is configured to control the power converter to output an alternating-current voltage corresponding to the voltage detection signal.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings.

First Embodiment

Figure 1:
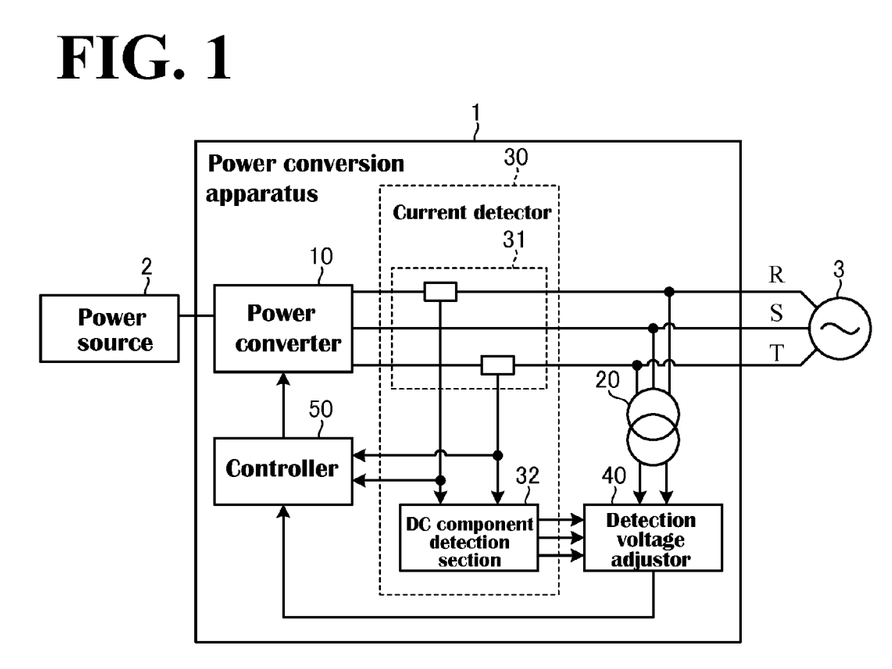
FIG. 1 is a diagram illustrating a configuration of a first embodiment of the power conversion apparatus.

FIG. 1 is a diagram illustrating a first embodiment of the power conversion apparatus. As shown in FIG. 1, a power conversion apparatus 1 according to the first embodiment is disposed between a power source 2 and a power system 3. The power conversion apparatus 1 converts power from the power source 2 into AC power and outputs the AC power to the power system 3. Examples of the power source 2 include, but not limited to, a generating apparatus and a fuel cell to convert natural energy, such as sunlight and wind, into electrical energy.

The power conversion apparatus 1 includes a power converter 10, a voltage detector 20, a current detector 30, a detection voltage adjustor 40, and a controller 50. The power converter 10 outputs AC voltage (hereinafter referred to as output voltage), which is controlled based on the voltage of the power system 3. This ensures power supply from the power conversion apparatus 1 to the power system 3.

The power converter 10 converts power from the power source 2 into AC power and outputs the AC power to the power system 3. When the power from the power source 2 is DC power, examples of the power converter 10 to be used include, but not limited to, an inverter circuit to convert DC power into AC power.

The voltage detector 20 detects the voltage of the power system 3. The result of detection is used to control the phase and the amplitude of output voltage of the power converter 10.

The current detector 30 includes a current detection section 31 and a DC component detection section 32. The current detection section 31 detects currents (hereinafter referred to as output currents) supplied from the power converter 10 to the power system 3. The DC component detection section 32 detects DC components contained in phase currents detected by the current detection section 31, and outputs the result of detection to the detection voltage adjustor 40.

The detection voltage adjustor 40 generates voltage detection signals using the detection output of the voltage detector 20 and using biases that are based on the respective DC components detected by the DC component detection section 32. The detection voltage adjustor 40 then outputs the voltage detection signals to the controller 50. The factors behind DC components being contained in the output currents include variations between the elements constituting the power converter 10.

The controller 50 carries out current feedback control to make a match between a target current value and each output current detected by the current detector 30. Each of the voltage detection signals output from the detection voltage adjustor 40 is added to the output of the current feedback control, generating an output voltage command.

The controller 50 controls the power converter 10 to output voltages each of which is the sum of the voltage of the power system 3 and a bias voltage corresponding to a DC component among the DC components of the output currents of the power converter 10. This accurately eliminates or minimizes DC components contained in the output currents.

Figure 2:
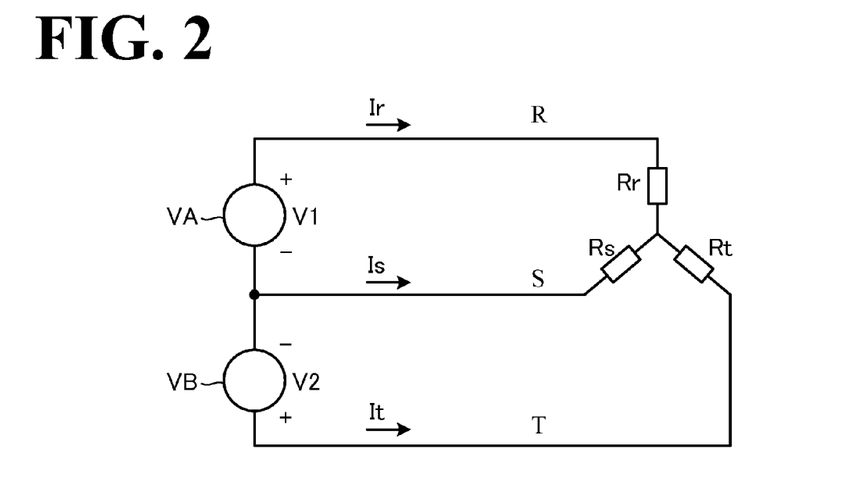
FIG. 2 is a diagram illustrating a simplified model of a power converter and a power system.

The process of removing a DC component contained in output current of the power converter 10 will be described by referring to FIG. 2. FIG. 2 is a diagram illustrating a simplified model of the power converter 10 and the power system 3, where the three-phase AC voltages are line voltages. The sum of the three line voltages supplied by the power converter 10 is zero. In view of this, the simplified model shown in FIG. 2 employs two AC power sources VA and VB with the power system 3 as a load. Since the following description is regarding a DC component, the impedance of the power system 3 is taken into consideration only on the resistance part, and resistances $R_r$, $R_s$, and $R_t$ respectively of the R, S, and T phases are assumed equal to each other and collectively designated at R.

In this case, the single-phase AC power sources VA and VB respectively have DC components $V_{1dc}$ and $V_{2dc}$, which are obtained by Formulae (1) and (2).

$$V_{1dc} = R(2I_{rdc} + I_{tdc}) \quad (1)$$

$$V_{2dc} = R(I_{rdc} + 2I_{tdc}) \quad (2)$$

where $I_{rdc}$ denotes a DC component occurring in a current $I_r$ flowing from the positive pole of the single-phase AC power source VA to the R phase, and $I_{tdc}$ denotes a DC component occurring in a current $I_t$ flowing from the positive pole of the single-phase AC power source VB to the T phase. Additionally, $I_{sdc}(=-I_{rdc}-I_{tdc})$ will denote a DC component occurring in a current $I_s$ flowing to the S phase from the contact point between the negative pole of the single-phase AC power source VA and the negative pole of the single-phase AC power source VB.

Thus, when the DC components $V_{1dc}$ and $V_{2dc}$ occur respectively in the single-phase AC power sources VA and VB, the DC components $V_{1dc}$ and $V_{2dc}$ respectively cause the DC components $I_{rdc}$ and $I_{tdc}$ to occur. The DC components $I_{rdc}$ and $I_{tdc}$ are detected by the DC component detection section 32. The voltage detector 20 detects voltages $V_1$ and $V_2$ respectively of the single-phase AC power sources VA and VB. The detection voltage adjustor 40 adds bias voltages $-V_{1dc}$ and $-V_{2dc}$ respectively to the voltages $V_1$ and $V_2$, thereby generating voltage detection signals. The bias voltages $-V_{1dc}$ and $-V_{2dc}$ respectively correspond to the DC components $I_{rdc}$ and $I_{tdc}$ detected by the DC component detection section 32.

Based on the voltage detection signals generated by the detection voltage adjustor 40, the controller 50 controls the single-phase AC power source VA to output a voltage that is the sum of the voltage $V_1$ and the bias voltage $-V_{1dc}$, and controls the single-phase AC power source VB to output a voltage that is the sum of the voltage $V_2$ and the bias voltage $-V_{2dc}$. This ensures removal of the DC components $I_{rdc}$ and $I_{tdc}$ respectively from the currents $I_r$ and $I_t$.

Thus, the power conversion apparatus 1 eliminates or minimizes the DC components of the output currents, and ensures improved quality of power output to the power system 3. When the output currents contain large DC components, the power system 3 can be influenced by, for example, DC magnetization of a pole transformer. The power conversion apparatus 1, however, eliminates or minimizes the DC components of the output currents, and this eliminates or minimizes the influence on the power system 3.

While in the first embodiment the power converter 10 supplies three-phase AC power, this should not be construed in a limiting sense. For example, the power conversion apparatus may output single-phase AC power.

Figure 3:
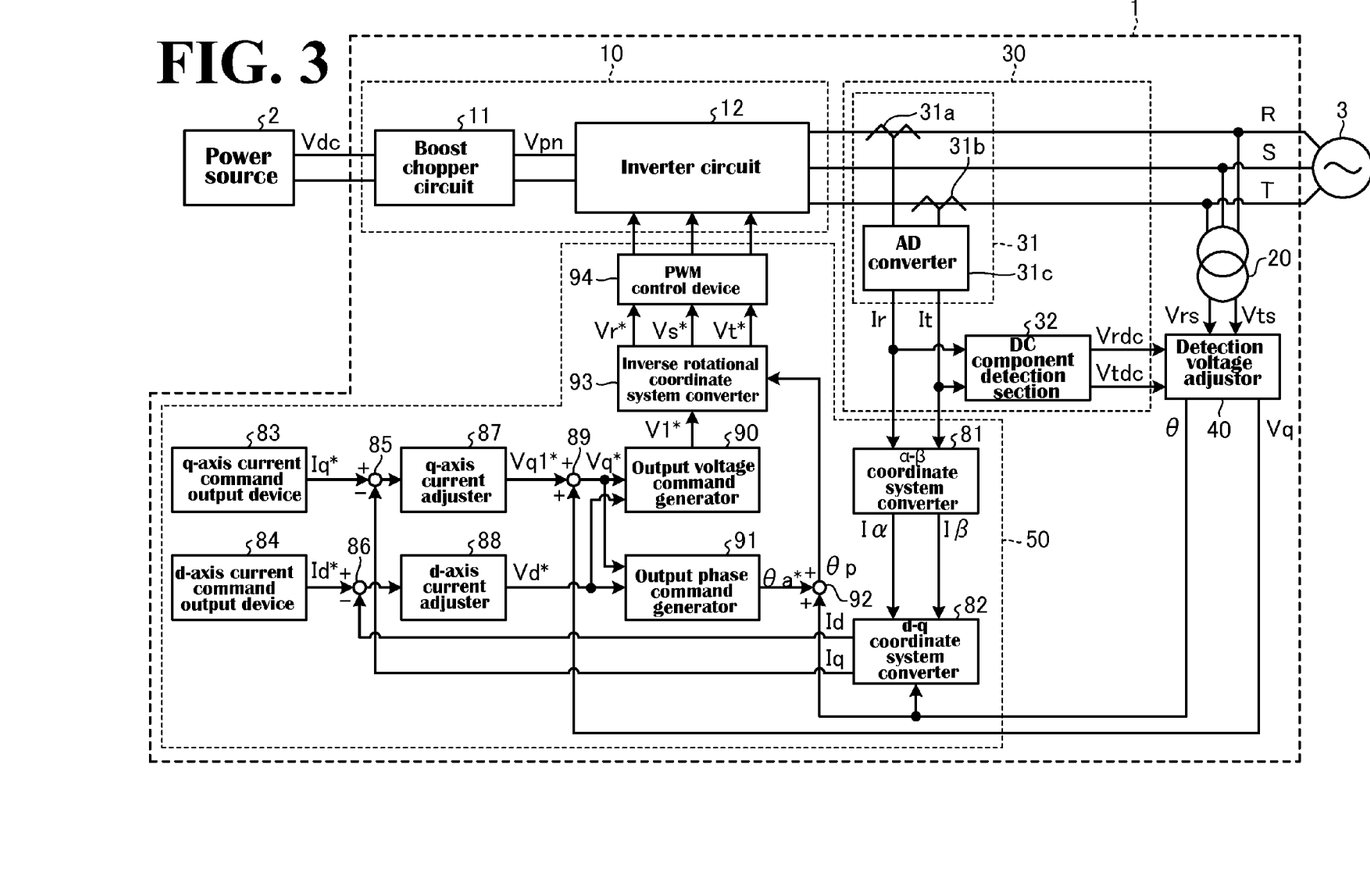
FIG. 3 is a diagram illustrating a detailed configuration of the first embodiment of the power conversion apparatus.

The power conversion apparatus 1 according to the first embodiment will be described further in detail by referring to the drawings. FIG. 3 is a diagram illustrating a detailed configuration of the power conversion apparatus 1 according to the first embodiment.

As shown in FIG. 3, the power conversion apparatus 1 includes the power converter 10, the voltage detector 20, the current detector 30, the detection voltage adjustor 40, and the controller 50.

The power converter 10 includes a boost chopper circuit 11 and an inverter circuit 12. The boost chopper circuit 11 boosts a DC voltage $V_{dc}$ output from the power source 2 and outputs the boosted DC voltage $V_{dc}$ to the inverter circuit 12. The boost chopper circuit 11 may not be necessary if the DC voltage $V_{dc}$ output from the power source 2 is convertible into the voltage of the power system 3 by the inverter circuit 12.

Figure 4:
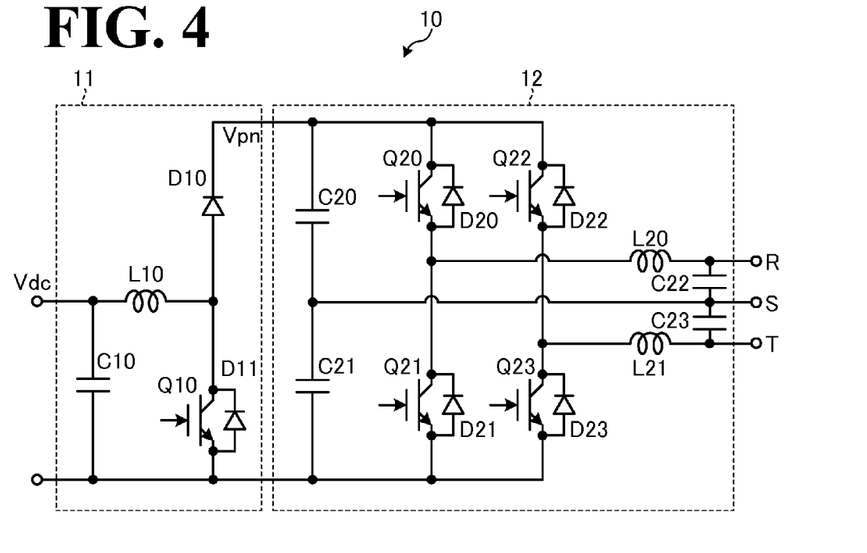
FIG. 4 is a diagram illustrating the power converter shown in FIG. 3.

An exemplary configuration of the power converter 10 will be described by referring to FIG. 4. FIG. 4 is a diagram illustrating the power converter 10. As shown in FIG. 4, the boost chopper circuit 11 includes a capacitor C10, a coil L10, a semiconductor switch element Q10, and diodes D10 and D11. In the boost chopper circuit 11, the semiconductor switch element Q10 is controlled between its on state and off state by the controller 50. This ensures that a DC voltage $V_{pn}$, which is boosted by the boost chopper circuit 11, is output to the inverter circuit 12. Examples of the semiconductor switch element Q10 include, but not limited to, a power semiconductor device such as IGBT and MOSFET. The boost chopper circuit 11, not limited to the configuration shown in FIG. 4, may be modified in various other manners.

As shown in FIG. 4, the inverter circuit 12 includes capacitors C20 to C23, semiconductor switch elements Q20 to Q23, diodes D20 to D23, and coils L20 and L21. In the inverter circuit 12, the semiconductor switch elements Q20 to Q23 are controlled between their on state and off state by the controller 50. This ensures that the inverter circuit 12 converts the DC voltage $V_{pn}$ into the voltage of the power system 3. Examples of the semiconductor switch elements Q20 to Q23 include, but not limited to, power semiconductor devices such as IGBT and MOSFET. The inverter circuit 12, not limited to the 2-level inverter shown in FIG. 4, may be a multi-level inverter or may be modified in various other manners.

Also in the first embodiment, the power from the power source 2 is DC power, and the power converter 10 includes an inverter circuit. This, however, should not be construed in a limiting sense. For example, when the power from the power source 2 is AC power, examples of the power converter 10 to be used include, but not limited to, a converter circuit together with an inverter circuit. The converter circuit would convert the AC power from the power source 2 into DC power, and the inverter circuit would convert the DC power output from the converter circuit into AC power that corresponds to the voltage of the power system 3. It is also possible to use a rectifier in place of the converter circuit.

Referring again to FIG. 3, the power conversion apparatus 1 will be further described. The voltage detector 20 has its input side coupled to the phases of the power system 3 so as to detect instantaneous values of the line voltage of the power system 3. Specifically, the voltage detector 20 detects an instantaneous value $V_{rs}$ of the line voltage between the R phase and the S phase (hereinafter referred to as R-S line voltage $V_{rs}$), and an instantaneous value $V_{ts}$ of the line voltage between the T phase and the S phase (hereinafter referred to as T-S line voltage $V_{ts}$).

The current detector 30 includes the current detection section 31 and the DC component detection section 32. The current detection section 31 includes current detection sub-sections 31a and 31b, and an AD converter 31c. The current detection sub-section 31a detects an instantaneous value $I_r$ of the R-phase current between the power converter 10 and the R phase of the power system 3 (the instantaneous value $I_r$ being hereinafter referred to as R-phase current $I_r$). The current detection sub-section 31b detects an instantaneous value $I_t$ of the T-phase current between the power converter 10 and the T phase of the power system 3 (the instantaneous value $I_t$ being hereinafter referred to as T-phase current $I_t$). The R-phase current $I_r$ and the T-phase current $I_t$ respectively detected by the current detection sub-sections 31a and 31b are input into the AD converter 31c, which in turn digitizes the R-phase current $I_r$ and the T-phase current $I_t$.

The DC component detection section 32 detects a DC component of the R-phase current and a DC component of the T-phase current, and generates an R-phase bias voltage $V_{rdc}$ and a T-phase bias voltage $V_{tdc}$. The R-phase bias voltage $V_{rdc}$ corresponds to the DC component of the R-phase current, while the T-phase bias voltage $V_{tdc}$ corresponds to the DC component of the T-phase current.

Figure 5:
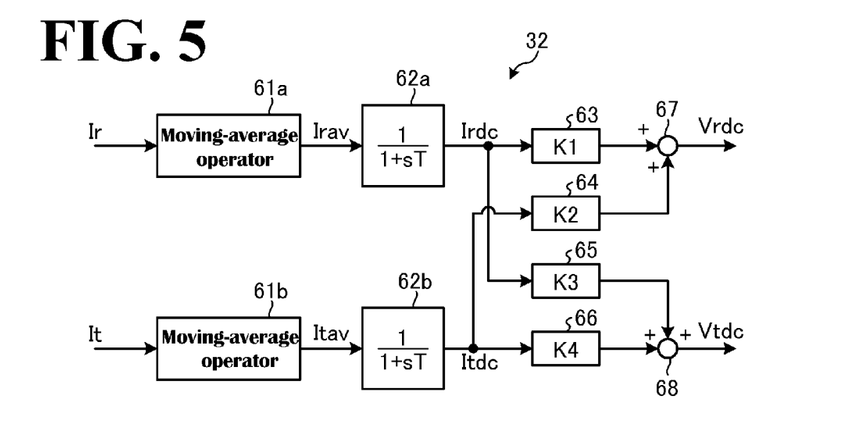
FIG. 5 is a diagram illustrating a configuration of a DC component detector shown in FIG. 3.

The DC component detection section 32 will be described in detail. FIG. 5 is a diagram illustrating the DC component detection section 32. As shown in FIG. 5, the DC component detection section 32 includes moving-average operators 61a and 61b, lowpass filters 62a and 62b, amplifiers 63 to 66, and adders 67 and 68.

The moving-average operator 61a obtains a moving average of the values of the R-phase current $I_r$. Specifically, the moving-average operator 61a obtains an average of the values of the R-phase current $I_r$ per current period of the power system 3, and outputs the average as a moving-average signal $I_{rav}$ of the R-phase current $I_r$.

The moving-average operator 61b obtains a moving average of the values of the T-phase current $I_t$. Specifically, the moving-average operator 61b obtains an average of the values of the T-phase current $I_t$ per current period of the power system 3, and outputs the average as a moving-average signal $I_{tav}$ of the T-phase current $I_t$.

The lowpass filter 62a removes high-frequency components of the moving-average signal $I_{rav}$ output from the moving-average operator 61a so as to detect the DC component $I_{rdc}$ of the R-phase current $I_r$. The lowpass filter 62a then outputs the DC component $I_{rdc}$ to the amplifiers 63 and 65. The amplifier 63 amplifies the DC component $I_{rdc}$ of the R-phase current $I_r$ at an amplification ratio $K_1$, and outputs the amplified DC component $I_{rdc}$ to the adder 67. The amplifier 65 amplifies the DC component $I_{rdc}$ of the R-phase current $I_r$ at an amplification ratio $K_3$, and outputs the amplified DC component $I_{rdc}$ to the adder 68. The lowpass filter 62a is a primary delay lowpass filter with, in the first embodiment, a time constant T of 400 ms. Formula (1) shows that in the first embodiment, the amplification ratio $K_1$ is "2R", while the amplification ratio $K_3$ is "R".

The lowpass filter 62b removes high-frequency components of the moving-average signal $I_{tav}$ output from the moving-average operator 61b so as to detect the DC component $I_{tdc}$ of the T-phase current $I_t$. The lowpass filter 62b then outputs the DC component $I_{tdc}$ to the amplifiers 64 and 66. The amplifier 64 amplifies the DC component $I_{tdc}$ of the T-phase current $I_t$ at an amplification ratio $K_2$, and outputs the amplified DC component $I_{tdc}$ to the adder 67. The amplifier 66 amplifies the DC component $I_{tdc}$ of the T-phase current $I_t$ at an amplification ratio $K_4$, and outputs the amplified DC component $I_{tdc}$ to the adder 68. Similarly to the lowpass filter 62a, the lowpass filter 62b is a primary delay lowpass filter with, in the first embodiment, a time constant T of 400 ms. Formula (2) shows that in the first embodiment, the amplification ratio $K_2$ is "R", while the amplification ratio $K_4$ is "2R".

The adder 67 calculates the sum of the outputs of the amplifiers 63 and 64 so as to generate the R-phase bias voltage $V_{rdc}$. Thus, the adder 67 generates the R-phase bias voltage $V_{rdc}$ based on Formula (1) using the DC component $I_{rdc}$ of the R-phase current $I_r$ and using the DC component $I_{tdc}$ of the T-phase current $I_t$.

The adder 68 calculates the sum of the outputs of the amplifiers 65 and 66 so as to generate the T-phase bias voltage $V_{tdc}$. Thus, the adder 68 generates the T-phase bias voltage $V_{tdc}$ based on Formula (2) using the DC component $I_{rdc}$ of the R-phase current $I_r$ and using the DC component $I_{tdc}$ of the T-phase current $I_t$.

Thus, the DC component detection section 32 includes the moving-average operators 61a and 61b, the lowpass filters 62a and 62b, the amplifiers 63 to 66, and the adders 67 and 68. The DC component detection section 32 detects the DC components $I_{rdc}$ and $I_{tdc}$ respectively contained in the R-phase current $I_r$ and the T-phase current $I_t$. The DC component detection section 32 then detects the R-phase bias voltage $V_{rdc}$ and the T-phase bias voltage $V_{tdc}$ respectively based on the DC components $I_{rdc}$ and $I_{tdc}$.

The DC component detection section 32 shown in FIG. 5 is for exemplary purposes only and open to various modifications. For example, the moving averages obtained by the moving-average operators 61a and 61b may be per a plurality of current periods. This eliminates the need for the lowpass filters 62a and 62b.

Referring again to FIG. 3, the power conversion apparatus 1 will be further described. The detection voltage adjustor 40 obtains a q-axis voltage detection signal $V_q$ and a phase θ based on the R-S line voltage $V_{rs}$, the T-S line voltage $V_{ts}$, the R-phase bias voltage $V_{rdc}$, and the T-phase bias voltage $V_{tdc}$.

Figure 6:
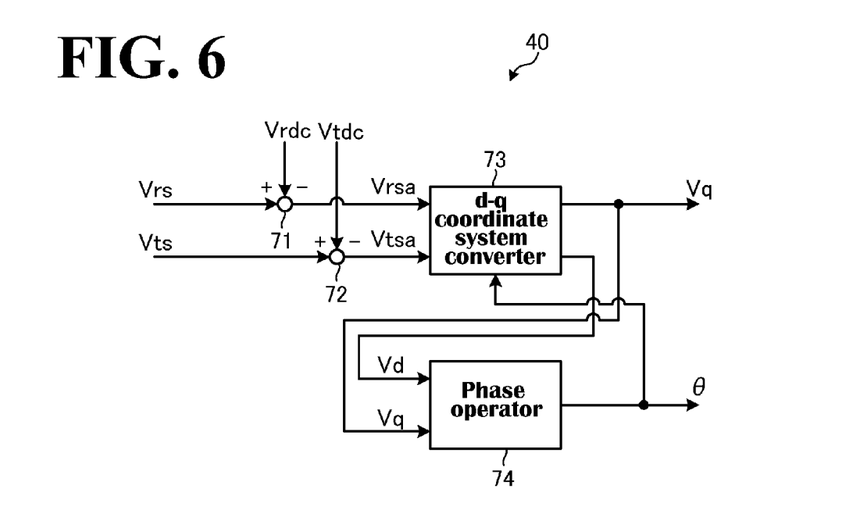
FIG. 6 is a diagram illustrating a configuration of a detection voltage adjustor shown in FIG. 3.

An exemplary configuration of the detection voltage adjustor 40 will be described in detail. FIG. 6 is a diagram illustrating the detection voltage adjustor 40. As shown in FIG. 6, the detection voltage adjustor 40 includes subtractors 71 and 72, a d-q coordinate system converter 73, and a phase operator 74.

The subtractor 71 subtracts the R-phase bias voltage $V_{rdc}$ from the R-S line voltage $V_{rs}$ so as to obtain the R-phase voltage detection signal $V_{rsa}$. The subtractor 71 then outputs the R-phase voltage detection signal $V_{rsa}$ to the d-q coordinate system converter 73, which is a rotational coordinate system converter. The subtractor 72 subtracts the T-phase bias voltage $V_{tdc}$ from the T-S line voltage $V_{ts}$ so as to obtain the T-phase voltage detection signal $V_{tsa}$. The subtractor 72 then outputs the T-phase voltage detection signal $V_{tsa}$ to the d-q coordinate system converter 73, which is a rotational coordinate system converter.

Based on a phase θ obtained by the phase operator 74 described later, the d-q coordinate system converter 73 converts the output of the subtractor 71 and the output of the subtractor 72 into d-q components of a d-q coordinate system. In this manner, the d-q coordinate system converter 73 obtains the q-axis voltage detection signal $V_q$ and a d-axis voltage detection signal $V_d$. As described later, the phase θ is generated such that the d-axis voltage detection signal $V_d$ has a value of zero. The d-q coordinate system converter 73, therefore, outputs the q-axis voltage detection signal $V_q$ alone as a detection value of the power amplitude of the power system 3.

The phase operator 74 obtains the phase θ based on the q-axis voltage detection signal $V_q$ and the d-axis voltage detection signal $V_d$ output from the d-q coordinate system converter 73. The phase θ is determined to make the d-axis voltage detection signal $V_d$ zero, and the determined phase θ is used by the d-q coordinate system converter 73 for the conversion into the d-q components of the d-q coordinate system. The phase operator 74 carries out closed loop control as described above so as to generate the phase θ, and outputs the phase θ as a detection value of the voltage phase of the power system 3.

Figure 7:
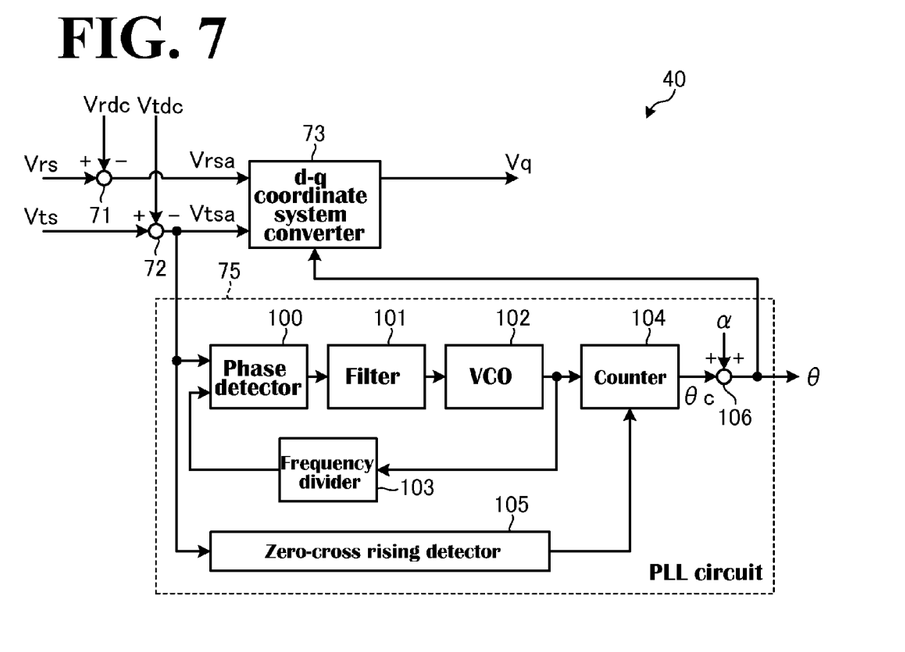
FIG. 7 is a diagram illustrating another configuration of the detection voltage adjustor shown in FIG. 3.

The detection voltage adjustor 40 shown in FIG. 6 is for exemplary purposes only, and other examples of the detection voltage adjustor 40 include the configuration shown in FIG. 7. The detection voltage adjustor 40 shown in FIG. 7 includes a phase locked loop (PLL) circuit 75 in place of the phase operator 74.

The PLL circuit 75 includes a phase detector 100, a filter 101, a voltage control oscillator (VCO) 102, a frequency divider 103, a counter 104, a zero-cross rising detector 105, and an adder 106.

The phase detector 100 compares the T-phase voltage detection signal $V_{tsa}$ with a frequency division signal output through an open loop from the frequency divider 103 so as to detect and output a phase difference. The filter 101 is a low-pass filter to set a loop time constant of the PLL circuit 75.

The voltage control oscillator 102 outputs a pulse signal having a frequency corresponding to a voltage output from the filter 101. The frequency divider 103 divides the output signal of the voltage control oscillator 102 into 1/N. This ensures that the output of the voltage control oscillator 102 has a frequency that is N times the frequency of the input signal of the voltage control oscillator 102. The counter 104 receives the output signal of the voltage control oscillator 102 so as to count the pulse number of the received output signal.

The zero-cross rising detector 105 detects the timing of zero-crossing of the T-phase voltage detection signal $V_{tsa}$ during its rising. When zero-crossing of the T-phase voltage detection signal $V_{tsa}$ occurs during its rising, the zero-cross rising detector 105 outputs a reset signal to the counter 104. This ensures that the counter 104 generates a phase $\theta_c$ counted from the timing of the zero-crossing of the T-phase voltage detection signal $V_{tsa}$ that occurred during its rising.

To the phase $\theta_c$ output from the counter 104, the adder 106 adds a corresponding to the T-phase voltage detection signal $V_{tsa}$. The adder 106 then outputs the sum as the phase θ of the power system 3. As used herein, α corresponding to the T-phase voltage detection signal $V_{tsa}$ refers to a value at which the d-axis voltage detection signal $V_d$ generated by the d-q coordinate system converter 73 has a value of zero.

Thus, the detection voltage adjustor 40 may use the PLL circuit 75 in place of the phase operator 74. In the detection voltage adjustor 40 shown in FIG. 7, the PLL circuit 75 may receive the R-phase voltage detection signal $V_{rsa}$ instead of the T-phase voltage detection signal $V_{tsa}$. In this case, α to be added to the phase $\theta_c$ output from the counter 104 corresponds to the R-phase voltage detection signal $V_{rsa}$. As used herein, α corresponding to the R-phase voltage detection signal $V_{rsa}$ refers to a value at which the d-axis voltage detection signal $V_d$ generated by the d-q coordinate system converter 73 has a value of zero.

Referring again to FIG. 3, the power conversion apparatus 1 will be further described. As shown in FIG. 3, the controller 50 includes an α-β coordinate system converter 81 and a d-q coordinate system converter 82. The α-β coordinate system converter 81 converts the R-phase current $I_r$ and the T-phase current $I_t$ respectively into an α component and a β component. The α-β components are coordinates of a fixed coordinate system defined by two perpendicular axes. In this manner, the α-β coordinate system converter 81 obtains a fixed coordinate current vector $I_{\alpha\beta}$ of the α-β coordinate system, with a current $I_\alpha$ in the α axis direction and a current $I_\beta$ in the β axis direction as vector components.

The d-q coordinate system converter 82 uses the phase θ output from the detection voltage adjustor 40 to convert the fixed coordinate current vector $I_{\alpha\beta}$ into d-q components of a d-q coordinate system. In this manner, the d-q coordinate system converter 82 obtains a rotational coordinate system current vector $I_{dq}$ ($I_d$, $I_q$), with a q-axis current $I_q$ and a d-axis current $I_d$ as vector components. The q-axis current $I_q$ is a current value in the q axis direction, while the d-axis current $I_d$ is a current value in the d axis direction. The d-q coordinate system is a coordinate system rotated relative to the α-β coordinate system by a degree corresponding to the phase θ.

The controller 50 further includes a q-axis current command output device 83, a d-axis current command output device 84, a q-axis current deviation operator 85, a d-axis current deviation operator 86, a q-axis current adjuster 87, a d-axis current adjuster 88, and a q-axis voltage command corrector 89. The controller 50 further includes an output voltage command generator 90, an output phase command generator 91, an adder 92, an inverse rotational coordinate system converter 93, and a PWM control device 94.

The q-axis current command output device 83 generates a q-axis current command $I_q^*$ and outputs the q-axis current command $I_q^*$ to the q-axis current deviation operator 85. The q-axis current command $I_q^*$ is a target value of active current. The q-axis current deviation operator 85 calculates the deviation of the q-axis current $I_q$ from the q-axis current command $I_q^*$ as a q-axis current deviation, and outputs the q-axis current deviation to the q-axis current adjuster 87.

The q-axis current adjuster 87 adjusts a q-axis voltage command $V_{q1}^*$ to make the deviation of the q-axis current $I_q$ from the q-axis current command $I_q^*$ zero. The q-axis current adjuster 87 then outputs the adjusted q-axis voltage command $V_{q1}^*$ to the q-axis voltage command corrector 89. To the q-axis voltage command $V_{q1}^*$ output from the q-axis current adjuster 87, the q-axis voltage command corrector 89 adds the q-axis voltage detection signal $V_q$ output from the detection voltage adjustor 40. The q-axis voltage command corrector 89 then outputs the sum as the q-axis voltage command $V_q^*$ to the output voltage command generator 90 and the output phase command generator 91.

The d-axis current command output device 84 generates a d-axis current command $I_d^*$ and outputs the d-axis current command $I_d^*$ to the d-axis current deviation operator 86. The d-axis current command $I_d^*$ is a target value of reactive current. The d-axis current deviation operator 86 calculates the deviation of the d-axis current $I_d$ from the d-axis current command $I_d^*$ as a d-axis current deviation, and outputs the d-axis current deviation to the d-axis current adjuster 88. The d-axis current adjuster 88 adjusts a d-axis voltage command $V_d^*$ to make the deviation of the d-axis current $I_d$ from the d-axis current command $I_d^*$ zero. The d-axis current adjuster

88 then outputs the adjusted d-axis voltage command $V_d^*$ to the output voltage command generator 90 and the output phase command generator 91.

The output voltage command generator 90 obtains an output voltage command $V_1^*$ based on the q-axis voltage command $V_q^*$ output from the q-axis voltage command corrector 89 and the d-axis voltage command $V_d^*$ output from the d-axis current adjuster 88. Specifically, the output voltage command generator 90 uses, for example, Formula (3) to obtain the output voltage command $V_1^*$. Formula (3) is for exemplary purposes only and open to various modifications.

$$\text{Output voltage command } V_1^* = (V_d^{*2} + V_q^{*2})^{1/2} \qquad (3)$$

The output phase command generator 91 obtains an output phase command $\theta_a^*$ based on the q-axis voltage command $V_q^*$ output from the q-axis voltage command corrector 89 and the d-axis voltage command $V_d^*$ output from the d-axis current adjuster 88. Specifically, the output phase command generator 91 uses, for example, Formula (4) to obtain the output phase command $\theta_a^*$.

$$\text{Output phase command } \theta_a^* = \tan^{-1}(V_q^*/V_d^*) \qquad (4)$$

To the output phase command $\theta_a^*$ output from the output phase command generator 91, the adder 92 adds the phase $\theta$ output from the detection voltage adjustor 40 so as to calculate a phase $\theta_p$.

Based on the output voltage command $V_1^*$ output from the output voltage command generator 90 and based on the phase $\theta_p$ calculated by the adder 92, the inverse rotational coordinate system converter 93 obtains three-phase AC voltage commands. Namely, the three-phase AC voltage commands include an R-phase output voltage command $V_r^*$ to the R phase of the power system 3, an S-phase output voltage command $V_s^*$ to the S phase of the power system 3, and a T-phase output voltage command $V_t^*$ to the T phase of the power system 3. Specifically, the inverse rotational coordinate system converter 93 uses, for example, Formulae (5) to (7) to obtain the R-phase output voltage command $V_r^*$, the S-phase output voltage command $V_s^*$, and the T-phase output voltage command $V_t^*$.

$$V_r^* = V_1^* \times \sin(\theta_p) \qquad (5)$$

$$V_s^* = V_1^* \times \sin(\theta_p - (2\pi/3)) \qquad (6)$$

$$V_t^* = V_1^* \times \sin(\theta_p + (2\pi/3)) \qquad (7)$$

The PWM control device 94 is a control signal output device that outputs PWM command signals, which are control signals, to the power converter 10. Specifically, based on the output voltage commands $V_r^*$, $V_s^*$, and $V_t^*$ output from the inverse rotational coordinate system converter 93 and based on the DC voltage $V_{pn}$, the PWM control device 94 generates and outputs gate signals to control the semiconductor switch elements Q20 to Q23 of the power converter 10. This ensures that the power converter 10 outputs three-phase AC voltages corresponding to their respective output voltage commands $V_r^*$, $V_s^*$, and $V_t^*$.

Thus, the power conversion apparatus 1 includes the detection voltage adjustor 40 and the controller 50. To the detection outputs of the voltage detector 20, the detection voltage adjustor 40 adds bias voltages corresponding to the DC components detected by the current detector 30, thereby generating voltage detection signals. The controller 50 controls the power converter 10 to output AC voltages corresponding to the respective voltage detection signals. This ensures effective removal of DC components from the output currents. This, as a result, improves the quality of power output to the power system 3.

In the first embodiment, the voltage detector 20 is illustrated as detecting an instantaneous value of the line voltage of the power system 3. In another embodiment, it is also possible to detect instantaneous values of the phase voltages of the R phase, the S phase, and the T phase. In this case, for example, the detection voltage adjustor 40 may have a function of converting the phase voltages into a line voltage. This another embodiment may otherwise be similar to the first embodiment.

In the first embodiment, the R-phase voltage detection signal $V_{rsa}$ and the T-phase voltage detection signal $V_{tsa}$ are first obtained, and then they are converted onto a rotational coordinate system. This, however, should not be construed in a limiting sense. For example, the R-S line voltage $V_{rs}$ and the R-phase bias voltage $V_{rdc}$ may be converted onto a rotational coordinate system mutually separately, while the T-S line voltage $V_{ts}$ and the T-phase bias voltage $V_{tdc}$ may be converted onto the rotational coordinate system mutually separately. Then on the rotational coordinate system, these converted voltages may serve as a basis on which to obtain the q-axis voltage detection signal $V_q$ and the d-axis voltage detection signal $V_d$ respectively corresponding to the R-phase voltage detection signal $V_{rsa}$ and the T-phase voltage detection signal $V_{tsa}$.

Figure 8:
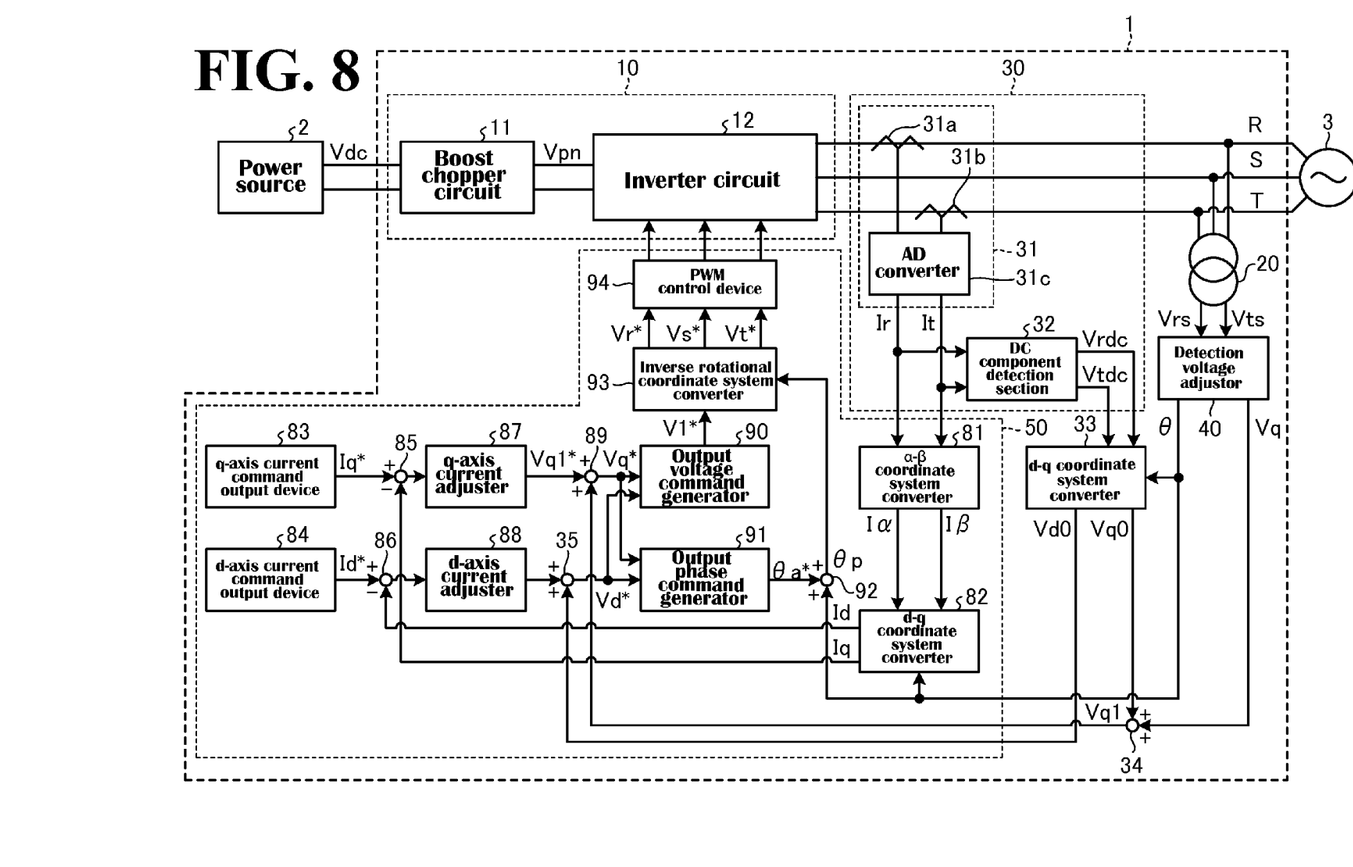
FIG. 8 is a diagram illustrating another detailed configuration of the first embodiment of the power conversion apparatus.

Specifically, as shown in FIG. 8, the power conversion apparatus 1 may include a d-q coordinate system converter 33 and adders 34 and 35. Upon receipt of the R-phase bias voltage $V_{rdc}$ and the T-phase bias voltage $V_{tdc}$ from the DC component detection section 32, the d-q coordinate system converter 33 uses the phase $\theta$ of the power system 3 to convert the R-phase bias voltage $V_{rdc}$ and the T-phase bias voltage $V_{tdc}$ into signals on a d-q coordinate system. In this manner, the d-q coordinate system converter 33 generates a q-axis voltage detection signal $V_{q0}$ and a d-axis voltage detection signal $V_{d0}$.

To the q-axis voltage detection signal $V_{q0}$ output from the d-q coordinate system converter 33, the adder 34 adds the q-axis voltage detection signal $V_q$ output from the detection voltage adjustor 40, thereby generating a q-axis voltage detection signal $V_{q1}$. The q-axis voltage command corrector 89 adds the q-axis voltage detection signal $V_{q1}$ to the q-axis voltage command $V_{q1}^*$, resulting in a q-axis voltage command $V_q^*$. The q-axis voltage command $V_q^*$ is output to the output voltage command generator 90 and the output phase command generator 91.

To the d-axis voltage detection signal $V_{d0}$ output from the d-q coordinate system converter 33, the adder 35 adds the q-axis voltage command output from the d-axis current adjuster 88, resulting in a d-axis voltage command $V_d^*$. The adder 35 outputs the d-axis voltage command $V_d^*$ to the output voltage command generator 90 and the output phase command generator 91.

In the embodiment of FIG. 8, the d-q coordinate system converter 33, the adders 34 and 35, and the detection voltage adjustor 40 constitute another detection voltage adjustor. To the detection output of the voltage detector 20, the other detection voltage adjustor adds a bias voltage corresponding to a DC component detected by the current detector 30, thereby generating a voltage detection signal. The other detection voltage adjustor then outputs the voltage detection signal. In this case, no subtractors 71 and 72 are necessary for the detection voltage adjustor 40. Instead, the R-S line voltage $V_{rs}$ and the T-S line voltage $V_{ts}$ are directly input to the d-q coordinate system converter 73.

Thus, it is possible to provide two detection voltage adjustors. Specifically, the one detection voltage adjustor may generate the q-axis voltage detection signal $V_q$ and the voltage phase θ from the detection voltage of the voltage detector 20. The other detection voltage adjustor may use the voltage phase θ to generate the q-axis voltage detection signal $V_{q0}$ and the d-axis voltage detection signal $V_{d0}$ from the DC components detected by the DC component detection section 32. Then, the voltage detection signals may be subjected to addition.

In the first embodiment, the output voltage command generator 90, the output phase command generator 91, the adder 92, and the inverse rotational coordinate system converter 93 are used to convert the voltage commands $V_d^*$ and $V_q^*$ of the rotational coordinate system into three-phase AC voltage commands, namely, the output voltage commands $V_r^*$, $V_s^*$, and $V_t^*$ respectively to the R phase, the S phase, and the T phase of the power system 3. Alternatively, the conversion may be by the use of inverse converters dedicated to the α-β coordinate system converter 81 and the d-q coordinate system converter 82.

Second Embodiment

A second embodiment of the power conversion apparatus will be described in detail by referring to FIGS. 9 to 11. Like reference numerals designate corresponding or identical elements throughout FIGS. 3, 5, 9, and 11, and these elements will not be elaborated here.

Figure 9:
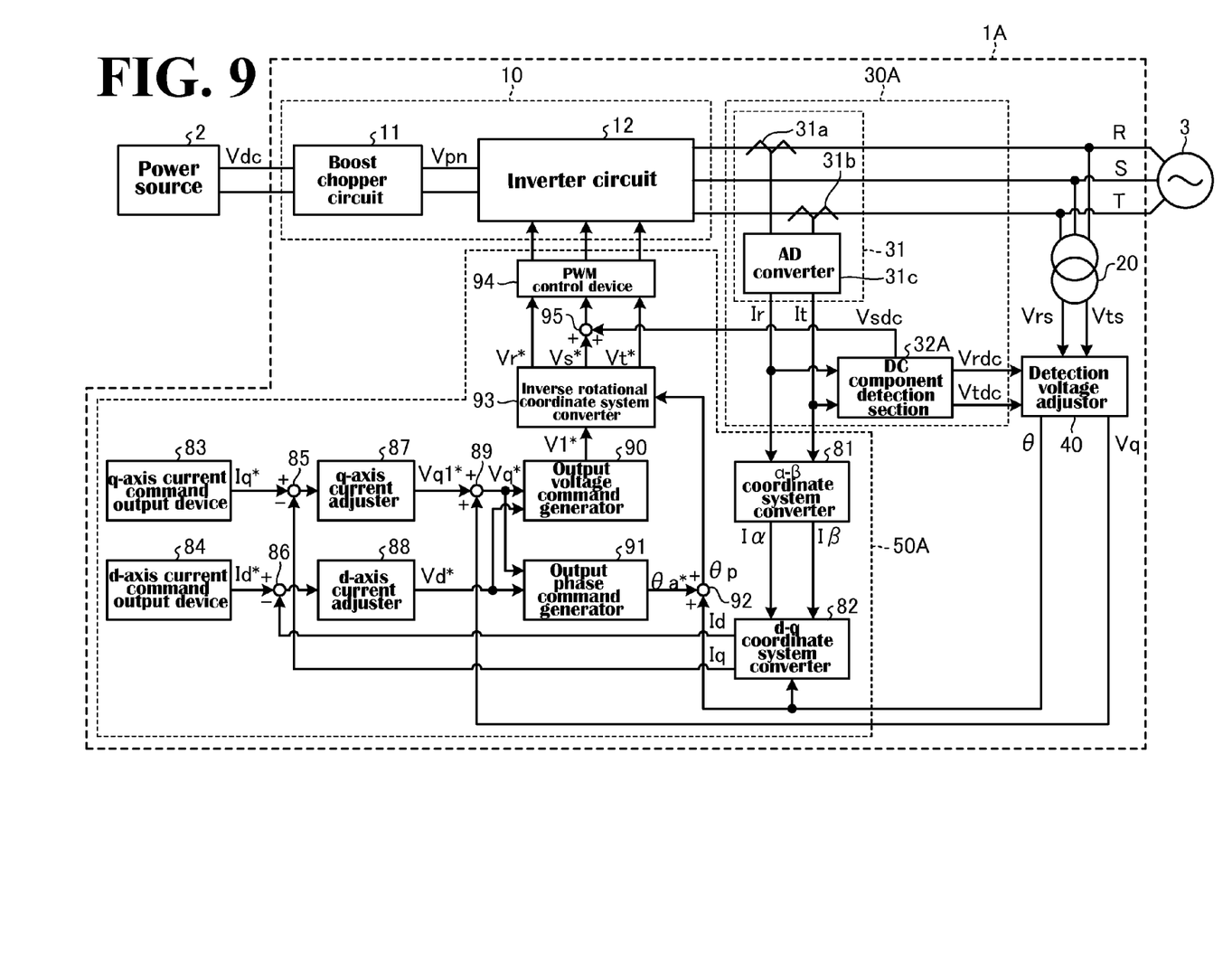
FIG. 9 is a diagram illustrating a detailed configuration of a second embodiment of the power conversion apparatus.
Figure 10:
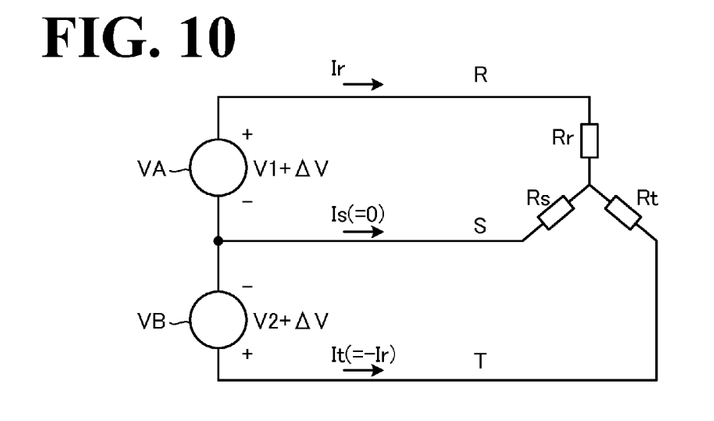
FIG. 10 is a diagram illustrating a simplified model of the power converter and the power system in the case where an adjustor is provided to make a DC component of a S phase current zero.

As shown in FIG. 9, a power conversion apparatus 1A according to the second embodiment includes a power converter 10, a voltage detector 20, a current detector 30A, a detection voltage adjustor 40, and a controller 50A. The power conversion apparatus 1A includes an adjustment loop to make a DC component $I_{sdc}$ of a S-phase current $I_s$ zero.

The process of removing a DC component contained in output current according to the second embodiment will be described by referring to FIG. 10. FIG. 10 is a diagram illustrating a simplified model of the power converter 10 and the power system 3, similarly to FIG. 2. The power converter 10 serves as ideal single-phase AC power sources VA and VB, and the power system 3 serves as a load.

As described later, the adjustment loop operates to make the DC component $I_{sdc}$ of the S-phase current $I_s$ zero. This results in a voltage adjustment of ΔV, turning the voltage of the single-phase AC power source VA from $V_1$ to $V_1+\Delta V$ and turning the voltage of the single-phase AC power source VB from $V_2$ to $V_2+\Delta V$.

When the adjustment loop corrects either the R-phase bias voltage $V_{rdc}$ or the T-phase bias voltage $V_{tdc}$ using the DC components $I_{rdc}$ and $I_{tdc}$ respectively contained in the R-phase current $I_r$ and the T-phase current $I_t$, this results in both the R-phase bias voltage $V_{rdc}$ and the T-phase bias voltage $V_{tdc}$ being adjusted.

The current detector 30A includes a current detection section 31 and a DC component detection section 32A. The DC component detection section 32A detects the DC components $I_{rdc}$ and $I_{tdc}$ respectively contained in the R-phase current $I_r$ and the T-phase current $I_t$ detected by the current detection section 31. Then, the DC component detection section 32A generates an R-phase bias voltage $V_{rdc}$, a T-phase bias voltage $V_{tdc}$, and an S-phase bias voltage $V_{sdc}$ corresponding to the DC components $I_{rdc}$ and $I_{tdc}$. FIG. 11 is a diagram illustrating the DC component detection section 32A in detail.

Figure 11:
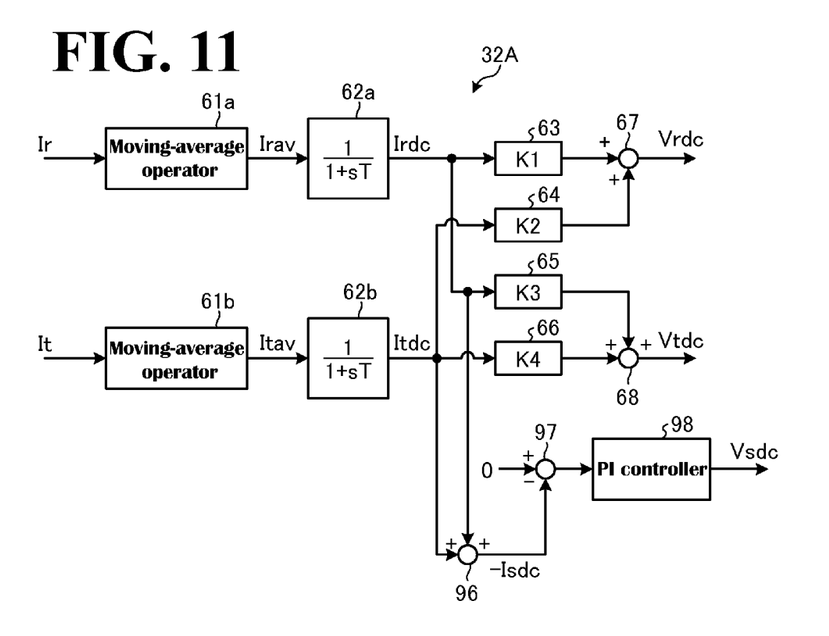
FIG. 11 is a diagram illustrating a configuration of a DC component detection section shown in FIG. 9.

As shown in FIG. 11, the DC component detection section 32A includes an adder 96, a subtractor 97, and a PI controller 98, in addition to the configuration of the DC component detection section 32 shown in FIG. 5. The adder 96 adds the DC component $I_{rdc}$ of the R-phase current $I_r$ output from the lowpass filter 62a to the DC component $I_{tdc}$ of the T-phase current $I_t$ output from the lowpass filter 62b, and outputs the sum to the subtractor 97.

The sum of instantaneous current values of the R phase, the S phase, and the T phase equals zero. In view of this, the value of the DC component $I_{sdc}$ of the S-phase current $I_s$ and the sum of the values of the DC component $I_{rdc}$ of the R-phase current $I_r$ and the DC component $I_{tdc}$ of the T-phase current $I_t$ have the same numerical parts with opposite signs, plus or minus. Hence, the output of the adder 96 and the value of the DC component $I_{sdc}$ of the S-phase current $I_s$ have the same numerical parts with opposite signs, plus or minus.

In this respect, if the DC component $I_{sdc}$ of the S-phase current $I_s$ has a value of zero, the DC component $I_{rdc}$ of the R-phase current $I_r$ and the DC component $I_{tdc}$ of the T-phase current $I_t$ have the same absolute values. In this case, adjusting the output voltage of the power converter 10 based on either the R-phase bias voltage $V_{rdc}$ or the T-phase bias voltage $V_{tdc}$ results in both $V_{1dc}$ and $V_{2dc}$ respectively shown in Formulae (1) and (2) being adjusted.

In view of this, the DC component detection section 32A has the subtractor 97 subtract the output of the adder 96 from zero, and has the PI controller 98 subject the output of the subtractor 97 to proportional integration (PI) control, thereby generating the S-phase bias voltage $V_{sdc}$. The PI controller 98 then outputs the S-phase bias voltage $V_{sdc}$ to the controller 50A.

As shown in FIG. 9, the controller 50A has its adder 95 add the S-phase bias voltage $V_{sdc}$ output from the PI controller 98 to the S-phase output voltage command $V_s^*$ output from the inverse rotational coordinate system converter 93. This ensures that the DC component $I_{sdc}$ of the S-phase current $I_s$ is controlled at zero.

As described above, the power conversion apparatus 1A according to the second embodiment ensures that the DC component detection section 32A adjusts the output voltage of the power converter 10 based on either the R-phase bias voltage $V_{rdc}$ or the T-phase bias voltage $V_{tdc}$. This ensures making the amplification ratios $K_1$ and $K_2$ respectively of the amplifiers 63 and 64 zero, or making the amplification ratios $K_3$ and $K_4$ respectively of the amplifiers 65 and 66 zero.

When the output voltage of the power converter 10 is adjusted based on the R-phase bias voltage $V_{rdc}$, there is no need for the amplifiers 65 and 66, the adder 68, and the subtractor 72 (see FIG. 6). When the output voltage of the power converter 10 is adjusted based on the T-phase bias voltage $V_{tdc}$, there is no need for the amplifiers 63 and 64, the adder 67, and the subtractor 71 (see FIG. 6).

The S-phase bias voltage $V_{sdc}$ may not necessarily be added to the S-phase output voltage command $V_s^*$. Instead, it is possible to carry out coordinate conversion of the S-phase bias voltage $V_{sdc}$ into a d-axis voltage and a q-axis voltage using the phase θ. The d-axis voltage and the q-axis voltage then may be respectively added to the output of the d-axis current adjuster 88 and the output of the q-axis current adjuster 87.

As shown in FIG. 11, the DC component detection section 32A detects the DC component $I_{sdc}$ of the S-phase current $I_s$ from the DC component $I_{rdc}$ of the R-phase current $I_r$ and from the DC component $I_{tdc}$ of the T-phase current $I_t$. It is also possible to provide the S phase with a current detector to directly detect the DC component $I_{sdc}$ of the S-phase current $I_s$.

The power conversion apparatus 1A according to the second embodiment is illustrated as including an adjustment loop to make the DC component $I_{sdc}$ of the S-phase current $I_s$ zero. Instead of making the DC component associated with the S phase zero, the adjustment loop may make the DC component associated with the R phase or the T phase zero.

While the inverter circuit 12 has been illustrated as having a main circuit configuration with two arms, it is also possible to employ a main circuit configuration with three arms. In this case, the output voltage commands $V_r^*$, $V_s^*$, and $V_t^*$ may be generated in the manner described in the above-described embodiments. The PWM control device 94 may output PWM command signals corresponding to the respective semiconductor switch elements of the inverter circuit 12. This configuration is otherwise approximately similar to the above-described embodiments.

When the power from the power source 2 is AC power, the power converter 10 may be a matrix converter to convert the AC power of the power source 2 into AC power accommodated to the voltage of the power system 3.

In the above-described embodiments, the current control and the voltage control are based on conversion onto rotational coordinate systems. This, however, should not be construed in a limiting sense. For example, it is also possible to carry out the current control and the voltage control without conversion onto rotational coordinate systems.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A power conversion apparatus comprising:
   a power converter configured to convert power from a power source into alternating-current power and configured to output the alternating-current power to a power system;
   a voltage detector configured to detect a voltage of the power system;
   a current detector configured to detect a direct-current component of a current between the power converter and the power system;
   a DC component detector configured to multiply the direct-current component of the current by a predetermined ratio to calculate a bias value;
   a detection voltage adjustor configured to add the bias value calculated by the DC component detector to the voltage detected by the voltage detector, so as to generate a voltage detection signal, and configured to output the voltage detection signal; and
   a controller configured to control the power converter to output an alternating-current voltage corresponding to the voltage detection signal.

2. The power conversion apparatus according to claim 1,
   wherein the voltage detector is configured to detect at least one of a line voltage and a phase voltage of the power system,
   wherein the power converter is configured to convert the power from the power source into three-phase alternating-current power and configured to output the three-phase alternating-current power to the power system,
   wherein the current detector is configured to detect direct-current components of a plurality of phase currents between the power converter and the power system,
   wherein the detection voltage adjustor is configured to generate voltage detection signals corresponding to respective biases corresponding to the respective direct-current components of the plurality of phase currents, and
   wherein the controller is configured to control the power converter to output three-phase alternating-current voltages corresponding to the respective voltage detection signals.

3. The power conversion apparatus according to claim 1,
   wherein the power converter is configured to convert power from the power source into three-phase alternating-current power,
   wherein the current detector is configured to detect a direct-current component of each of two-phase currents between the power converter and the power system,
   wherein the DC component detector is configured to multiply each of the direct-current component of each of the two-phase currents by the predetermined ratio to calculate the bias value, and
   wherein the controller is configured to control the power converter to output the three-phase alternating-current voltage corresponding to the voltage detection signal.

4. A power conversion apparatus comprising:
   a power converter configured to convert power from a power source into alternating-current power and configured to output the alternating-current power to a power system;
   a voltage detector configured to detect a voltage of the power system;
   a current detector configured to detect a direct-current component of a current between the power converter and the power system;
   a detection voltage adjustor configured to add a bias corresponding to the direct-current component to the voltage detected by the voltage detector, so as to generate a voltage detection signal, and configured to output the voltage detection signal; and
   a controller configured to control the power converter to output an alternating-current voltage corresponding to the voltage detection signal,
   wherein the voltage detector is configured to detect at least one of a line voltage and a phase voltage of the power system,
   wherein the power converter is configured to convert the power from the power source into three-phase alternating-current power and configured to output the three-phase alternating-current power to the power system,
   wherein the current detector is configured to detect direct-current components of a plurality of phase currents between the power converter and the power system,
   wherein the detection voltage adjustor is configured to generate voltage detection signals corresponding to respective biases corresponding to the respective direct-current components of the plurality of phase currents,
   wherein the controller is configured to control the power converter to output three-phase alternating-current voltages corresponding to the respective voltage detection signals,
   wherein the detection voltage adjustor comprises a rotational coordinate system converter configured to convert the voltage detection signals onto a rotational coordinate system defined by two perpendicular axes, and
   wherein the controller comprises
       an output voltage command generator configured to generate an output voltage command on the rotational coordinate system based on the converted voltage detection signals,
       an inverse rotational coordinate system converter configured to convert the output voltage command on the rotational coordinate system into three-phase alternating-current voltage commands, and a control signal output device configured to output, to the power converter, control signals corresponding to the respective three-phase alternating-current voltage commands so as to control the power converter to output three-phase alternating-current voltages.

5. The power conversion apparatus according to claim 4, wherein the detection voltage adjustor comprises a phase operator configured to detect a phase of the power system based on the converted voltage detection signals, and wherein the rotational coordinate system onto which the voltage detection signals are converted by the rotational coordinate system converter is configured to rotate synchronously with the phase of the power system detected by the phase operator.

6. The power conversion apparatus according to claim 5, wherein the phase operator is configured to detect the phase of the power system such that one voltage detection signal that is among the converted voltage detection signals and that corresponds to one axis among the two perpendicular axes has a value of zero.

7. The power conversion apparatus according to claim 6, wherein the controller is configured to control the power converter to output the three-phase alternating-current voltages such that one direct-current component of one phase current among the direct-current components of the plurality of phase currents detected by the current detector has a value of zero.

8. The power conversion apparatus according to claim 4, wherein the current detector is configured to detect values of currents between the power converter and the power system,
wherein the controller comprises
a conversion device configured to convert the values of the currents detected by the current detector into current values on the rotational coordinate system, and
a current command output device configured to output current commands, and
a current adjustment device configured to generate voltage commands each corresponding to a deviation of one current value among the current values converted by the converter from one current command among the current commands output from the current command output device, and
wherein the output voltage command generator is configured to generate the output voltage command on the rotational coordinate system based on the voltage detection signals on the rotational coordinate system and based on the voltage commands generated by the current adjustment device.

9. The power conversion apparatus according to claim 5, wherein the current detector is configured to detect values of currents between the power converter and the power system,
wherein the controller comprises
a conversion device configured to convert the values of the currents detected by the current detector into current values on the rotational coordinate system, and
a current command output device configured to output current commands, and
a current adjustment device configured to generate voltage commands each corresponding to a deviation of one current value among the current values converted by the converter from one current command among the current commands output from the current command output device, and
wherein the output voltage command generator is configured to generate the output voltage command on the rotational coordinate system based on the voltage detection signals on the rotational coordinate system and based on the voltage commands generated by the current adjustment device.

10. The power conversion apparatus according to claim 6, wherein the current detector is configured to detect values of currents between the power converter and the power system,
wherein the controller comprises
a conversion device configured to convert the values of the currents detected by the current detector into current values on the rotational coordinate system, and
a current command output device configured to output current commands, and
a current adjustment device configured to generate voltage commands each corresponding to a deviation of one current value among the current values converted by the converter from one current command among the current commands output from the current command output device, and
wherein the output voltage command generator is configured to generate the output voltage command on the rotational coordinate system based on the voltage detection signals on the rotational coordinate system and based on the voltage commands generated by the current adjustment device.

11. The power conversion apparatus according to claim 7, wherein the current detector is configured to detect values of currents between the power converter and the power system,
wherein the controller comprises
a conversion device configured to convert the values of the currents detected by the current detector into current values on the rotational coordinate system, and
a current command output device configured to output current commands, and
a current adjustment device configured to generate voltage commands each corresponding to a deviation of one current value among the current values converted by the converter from one current command among the current commands output from the current command output device, and
wherein the output voltage command generator is configured to generate the output voltage command on the rotational coordinate system based on the voltage detection signals on the rotational coordinate system and based on the voltage commands generated by the current adjustment device.

12. A power conversion apparatus comprising:
a power converter configured to convert power from a power source into alternating-current power and configured to output the alternating-current power to a power system;
a voltage detector configured to detect a voltage of the power system;
a current detector configured to detect a direct-current component of a current between the power converter and the power system;
a detection voltage adjustor configured to add a bias corresponding to the direct-current component to the voltage detected by the voltage detector, so as to generate a voltage detection signal, and configured to output the voltage detection signal; and a controller configured to control the power converter to output an alternating-current voltage corresponding to the voltage detection signal, wherein the voltage detector is configured to detect at least one of a line voltage and a phase voltage of the power system, wherein the power converter is configured to convert the power from the power source into three-phase alternating-current power and configured to output the three-phase alternating-current power to the power system, wherein the current detector is configured to detect direct-current components of a plurality of phase currents between the power converter and the power system, wherein the detection voltage adjustor is configured to generate voltage detection signals corresponding to respective biases corresponding to the respective direct-current components of the plurality of phase currents, wherein the controller is configured to control the power converter to output three-phase alternating-current voltages corresponding to the respective voltage detection signals, wherein the detection voltage adjustor comprises
- a first rotational coordinate system converter configured to convert the voltage detected by the voltage detector into signals on a rotational coordinate system defined by two perpendicular axes,
- a second rotational coordinate system converter configured to convert the biases corresponding to the respective direct-current components detected by the current detector into signals on the rotational coordinate system, and
- an adder configured to add the signals converted by the second rotational coordinate system converter on the rotational coordinate system to the respective signals converted by the first rotational coordinate system converter on the rotational coordinate system, and configured to output sums of the signals as the voltage detection signals, and wherein the controller comprises
- an output voltage command generator configured to generate an output voltage command on the rotational coordinate system based on the voltage detection signals generated by the adder,
- an inverse rotational coordinate system converter configured to convert the output voltage command on the rotational coordinate system into three-phase alternating-current voltage commands, and
- a control signal output device configured to output control signals corresponding to the respective three-phase alternating-current voltage commands to the power converter so as to control the power converter to output three-phase alternating-current voltages.

13. The power conversion apparatus according to claim 12, wherein the detection voltage adjustor comprises a phase operator configured to detect a phase of the power system based on the signals converted by the first rotational coordinate system converter on the rotational coordinate system, wherein the rotational coordinate system on which the voltage detected by the voltage detector is converted into the signals by the first rotational coordinate system converter is configured to rotate synchronously with the phase of the power system detected by the phase operator, and wherein the rotational coordinate system on which the biases corresponding to the respective direct-current components are converted into the signals by the second rotational coordinate system converter is configured to rotate synchronously with the phase of the power system detected by the phase operator.

14. The power conversion apparatus according to claim 13, wherein the phase operator is configured to detect the phase of the power system such that one signal that is among the signals converted by the first rotational coordinate system converter and that corresponds to one axis among the two perpendicular axes has a value of zero.

15. The power conversion apparatus according to claim 14, wherein the controller is configured to control the power converter to output the three-phase alternating-current voltages such that one direct-current component of one phase current among the direct-current components of the plurality of phase currents detected by the current detector has a value of zero.

16. The power conversion apparatus according to claim 12,
wherein the current detector is configured to detect values of currents between the power converter and the power system, wherein the controller comprises
- a conversion device configured to convert the values of the currents detected by the current detector into current values on the rotational coordinate system, and
- a current command output device configured to output current commands, and
- a current adjustment device configured to generate voltage commands each corresponding to a deviation of one current value among the current values converted by the converter from one current command among the current commands output from the current command output device, and wherein the output voltage command generator is configured to generate the output voltage command on the rotational coordinate system based on the voltage detection signals on the rotational coordinate system and based on the voltage commands generated by the current adjustment device.

17. The power conversion apparatus according to claim 13,
wherein the current detector is configured to detect values of currents between the power converter and the power system, wherein the controller comprises
- a conversion device configured to convert the values of the currents detected by the current detector into current values on the rotational coordinate system, and
- a current command output device configured to output current commands, and
- a current adjustment device configured to generate voltage commands each corresponding to a deviation of one current value among the current values converted by the converter from one current command among the current commands output from the current command output device, and wherein the output voltage command generator is configured to generate the output voltage command on the rotational coordinate system based on the voltage detection signals on the rotational coordinate system and based on the voltage commands generated by the current adjustment device.

18. The power conversion apparatus according to claim 14,
wherein the current detector is configured to detect values of currents between the power converter and the power system, wherein the controller comprises a conversion device configured to convert the values of the currents detected by the current detector into current values on the rotational coordinate system, and a current command output device configured to output current commands, and a current adjustment device configured to generate voltage commands each corresponding to a deviation of one current value among the current values converted by the converter from one current command among the current commands output from the current command output device, and wherein the output voltage command generator is configured to generate the output voltage command on the rotational coordinate system based on the voltage detection signals on the rotational coordinate system and based on the voltage commands generated by the current adjustment device.

19. The power conversion apparatus according to claim 15, wherein the current detector is configured to detect values of currents between the power converter and the power system, wherein the controller comprises a conversion device configured to convert the values of the currents detected by the current detector into current values on the rotational coordinate system, and a current command output device configured to output current commands, and a current adjustment device configured to generate voltage commands each corresponding to a deviation of one current value among the current values converted by the converter from one current command among the current commands output from the current command output device, and wherein the output voltage command generator is configured to generate the output voltage command on the rotational coordinate system based on the voltage detection signals on the rotational coordinate system and based on the voltage commands generated by the current adjustment device.

* * * * *